Aug. 30, 1927.
W. E. LEIBING
1,640,945
DISPENSING FAUCET
Filed April 28, 1926
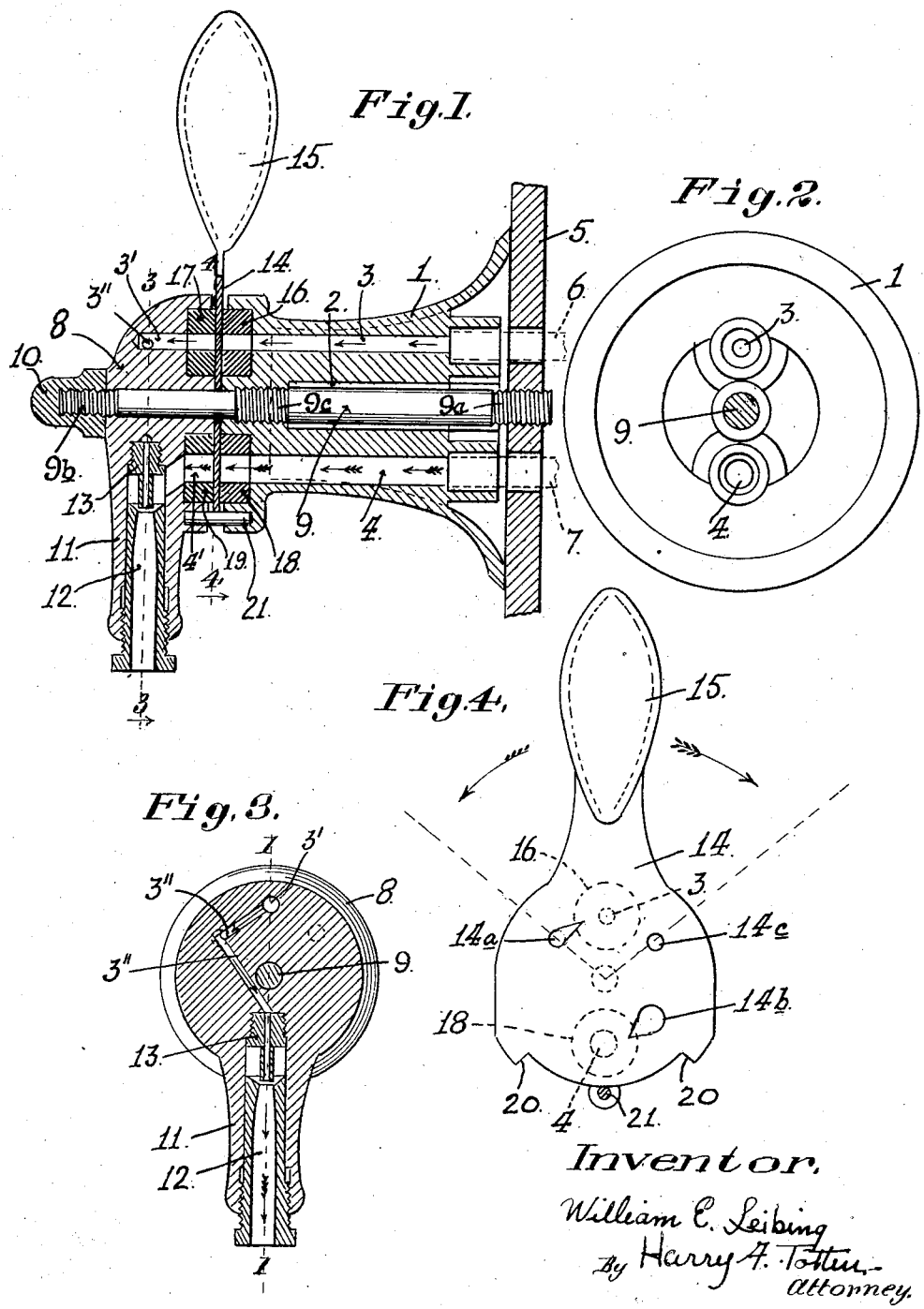
Inventor,
William E. Leibing
by Harry A. Totten
Attorney.

Patented Aug. 30, 1927.

1,640,945

UNITED STATES PATENT OFFICE.

WILLIAM E. LEIBING, OF OAKLAND, CALIFORNIA, ASSIGNOR TO MAGNUS FRUIT PRODUCTS CO., OF SAN FRANCISCO, CALIFORNIA, A CORPORATION OF CALIFORNIA.

DISPENSING FAUCET.

Application filed April 28, 1926. Serial No. 105,049.

My invention relates to the class of faucets, and is especially adapted for the delivery of plural fluid streams, either severally or jointly, and more particularly for the convenient dispensing of carbonated beverages.

The object of my invention is to provide a faucet of simple construction, the members of which may be conveniently assembled, easily adjusted for continuous orderly operation, taken apart for repairs and renewals, and the whole assemblage effectively secured to a supporting wall in proper communication with the sources of fluid supply.

Another object of my invention is to provide the fluid outlet of the faucet with a simple injector mixer, readily insertable, easily adjustable and conveniently removable.

The nature of my invention will fully appear from the following description in connection with the accompanying drawings in which my improved faucet is shown in its preferred form, it being understood that changes may be made in its structure, form and arrangement without departing from the spirit of my invention as defined by the claims hereunto appended.

In the drawings—

Fig. 1 is a longitudinal section of my dispensing faucet, showing its members assembled and secured to a supporting wall.

Fig. 2 is a rear elevation of the body member of the faucet, the clamping and supporting bolt being shown in cross section.

Fig. 3 is a section on the line 3—3 of Fig. 1.

Fig. 4 is an elevation of the ported valve member of the faucet, along the line 4—4 of Fig. 1, and indicating by dotted lines and arrows its oscillatory movement and its control of the faucet passages.

1 is the body member of the faucet, having a through bore 2 in its axis, and one or more through passages parallel with its axis. There may be any number of these passages according to the number of fluid streams which the faucet is adapted to handle. For the sake of example, I have here shown two such passages, an upper one indicated by 3 and a lower one indicated by 4, the former being adapted for a gaseous fluid and the latter for a liquid fluid, or for any other fluid streams, as for instance, hot and cold water. 5 is a section of a wall through which lead, as shown by the dotted lines in Fig. 1, the upper and lower connections 6 and 7, respectively, from the sources of fluid supply. The body member 1 is fitted to the wall 5 and to the protruding fluid connections 6 and 7 in such relation that communication of its passages 3 and 4 with said connections 6 and 7, respectively, is established.

8 is the nozzle member of the faucet, fitted to the body member. 9 is the carrying and clamping bolt of the faucet. It is a pin or stud having threads $9^a$ on its inner end, threads $9^b$ on its outer end, and threads $9^c$ intermediate its ends. The bolt 9 passes longitudinally through the axis of the faucet, its inner end threads $9^a$ engaging the wall 5, its intermediate threads $9^c$ engaging the body member 1, and its outer end threads $9^b$ protruding from the face of the nozzle member 8 and receiving a nut 10. Thus, by means of said bolt 9 and its nut 10, the members of the faucet are assembled, and the complete faucet held to the wall.

The nozzle member 8 has an outlet 11, and, according to the initial adaptation of the faucet for handling one or more fluids it is provided with suitable passages for placing the passages of the body member in communication with said outlet. Accordingly, in the present illustration, the nozzle member has a passage $3'$ aligned with the passage 3 of the body member, and a passage $4'$ aligned with the passage 4 of said body member. The passage $4'$ leads directly into the upper end of the outlet 11 of the nozzle member; and the passage $3'$ through an angular extension $3''$, side-passing the axis bolt, as seen in Fig. 3, also leads into said outlet 11.

In order to effect a more thorough mixing of the fluids thus led to the common outlet, I fit said outlet with a discharge device in the nature of an injector or Venturi-tube. This comprises a tube 12 and a nipple 13 both screwed into the outlet 11, and associated with each other and with the inleading passages in a manner usual with such devices, and clearly illustrated in Figs. 1 and 3.

The faucet is operated by means of the valve member 14, which consists of a plate with a handle 15, and with ports which, in the present illustration, are three in number designated by $14^a$, $14^b$ and $14^c$, so disposed as to function in the manner presently to be described. The valve member 14 is assembled with the body member 1 and the nozzle member 8 as follows. It lies between the opposing faces of said last named members and is mounted for oscillation upon the bolt 9, by which movement its ports are carried into and out of registration with the respective passages they control. In order to secure a tight joint about the ports and passages in thus fitting and moving the valve-member, there are elastic washers 16 and 17 seated in the body member and in the nozzle member, respectively, around their passages 3 and 3' respectively, and elastic washers 18 and 19 seated in said members around their passages 4 and 4' respectively. Each of these washers normally projects beyond the plane of the face of the member in which it is seated, as is shown in Fig. 1; and the valve member plays between and in contact with the protruding faces of said washers. The joints thus formed are tightened to the required degree, initially, and subsequently as the washers wear, by the simple and convenient expedient of setting up the nut 10 on the clamping bolt 9; and when the washers wear out, the nozzle member can be removed upon backing off the nut 10, the worn washers discarded and new ones substituted, an operation manifestly convenient and practicable.

In the arrangement of ports in the valve-member 14, as in the example here shown, the ports $14^a$ and $14^b$ control the communication of the passages 3 and 3', and the communication of the passages 4 and 4' respectively, and these ports are relatively placed in such wise, as shown in Fig. 4, that they open and close said communications in unison, whereby two fluids may be supplied together.

It may be noted also that as shown in Fig. 4, these ports $14^a$ and $14^b$ may be dimensionally tapered to graduate the fluid volume as desired.

The third port $14^c$ is so placed as to control the communication of the passages 3 and 3' only.

As heretofore stated, the number and arrangement of the passages and ports herein shown and described are merely by way of example, since these are matters which may be varied, the essential structure of the faucet lending itself perfectly to changes of this nature.

In order to define the limits of oscillation of the valve member 14, the base of said member is oppositely shouldered as shown at 20 in Fig. 4, in order to contact with a cross stop-pin 21, seated between the adjacent faces of the body member and the nozzle member.

I claim:—

1. A faucet, comprising a body member having a passage; a nozzle member having a passage registering with the passage of the body member; means for clamping the two members together; a ported valve member mounted for oscillation between the adjacent faces of the body member and the nozzle member, to control the registering passages thereof; and packing washers seated in the adjacent faces of said members surrounding the ends of the passages and adapted under the pressure of the clamping means to be compressed upon the opposite faces of the valve member, the surfaces of said packing members projecting beyond the wall of said body and nozzle members.

2. A faucet, comprising a body member having a passage; a nozzle member having a passage registering with the passage of the body member; a bolt passing through said members threaded into the body member with its opposite ends threaded and projecting beyond the ends of the body member, said nozzle provided with a bolt receiving opening through which one threaded end of the bolt extends a nut for reception on the bolt end for clamping said members together, the other threaded bolt end adapted for jointly securing said members to a fixed support; a ported valve member seated between the adjacent faces of the body member and the nozzle member and mounted for oscillation upon said bolt with its opposite faces spaced from the ends of said members, to control said registering passages; and packing washers seated in the adjacent faces of said body and nozzle members about their passages and adapted under the setting-up pressure of said nut to be compressed upon the opposite faces of the valve member.

3. A faucet having controllable means for delivering plural fluids to a common outlet, an injector nipple fitted in said outlet in communication with the delivery of one of said fluids, and a Venturi tube also fitted in said outlet with which said injector nipple is associated, said tube being in communication with the delivery of the other of said fluids.

4. A faucet, comprising a body member having a passage, a nozzle member having a passage registering with the passage of the body member; a bolt passing through said members with its opposite ends threaded and projecting beyond the body member, a ported valve member between the adjacent faces of the body member and nozzle member for oscillation upon said bolt to control said registering passages, said nozzle provided with a bolt receiving opening through which one threaded end of the bolt extends, a nut for reception on the bolt end for clamping said members together, the other threaded bolt end adapted for jointly securing said members to a fixed support.

In testimony whereof I have signed my name to this specification.

WILLIAM E. LEIBING.